United States Patent
Micheron et al.

[11] 3,782,802
[45] Jan. 1, 1974

[54] FERRO-ELECTRIC SYSTEM FOR BULK STORAGE OF PHASE HOLOGRAMS

[75] Inventors: Francois Micheron; Guy Bismuth, both of Paris, France

[73] Assignee: Thomson-CSF, Paris, France

[22] Filed: Sept. 13, 1972

[21] Appl. No.: 288,670

[30] Foreign Application Priority Data
Sept. 20, 1971  France .................. 7133727

[52] U.S. Cl. .......... 350/3.5, 340/173 LS, 340/173.2
[51] Int. Cl. ...................... G02b 27/38, G11b 9/02
[58] Field of Search .................. 340/173 LS, 173.2; 350/3.5

[56] References Cited
UNITED STATES PATENTS
3,652,145  3/1972  Thaxter .................. 350/3.5
3,544,189  12/1970  Chen et al. ............. 340/173 LS
3,517,206  6/1970  Oliver .................... 340/173 LS OTHER PUBLICATIONS
Keneman et al.; "Storage of Holograms in a Ferroelectric–Photoconductor Device", Applied Physic Letters, Aug. 15, 1970, pp. 173–175.

Primary Examiner—H. K. Saalbach
Attorney—John W. Malley et al.

[57] ABSTRACT

The present invention relates to phase holography and more particularly to ferro-electric systems for bulk storage of phase holograms. The system in accordance with the invention comprises a photo excitable ferro-electric material having a hysteresis cycle at ambient temperature, wherein a electric field is created for at least partially reversing the remanent polarisation thereby fixing a fringe pattern photo induced within said ferro-electric material. The system can be used in optical bulk stores and for building up thick holographic lenses.

12 Claims, 7 Drawing Figures

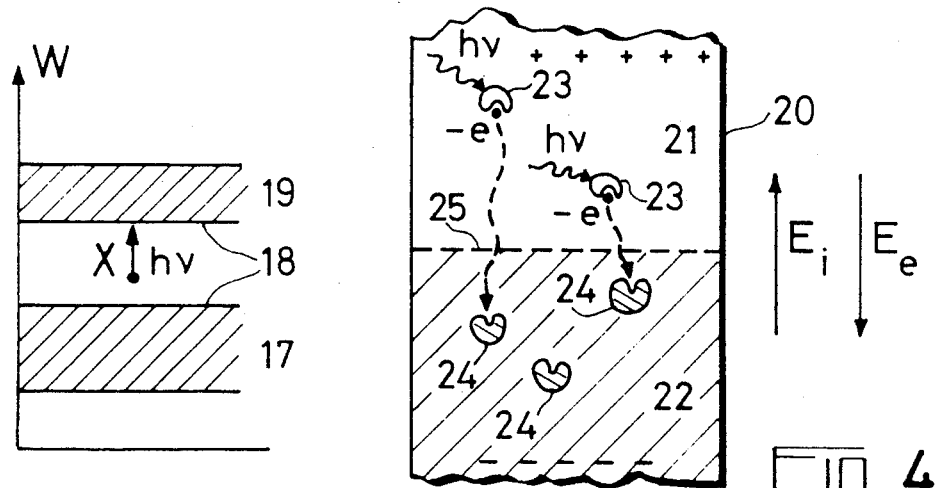
Fig. 3
Fig. 4
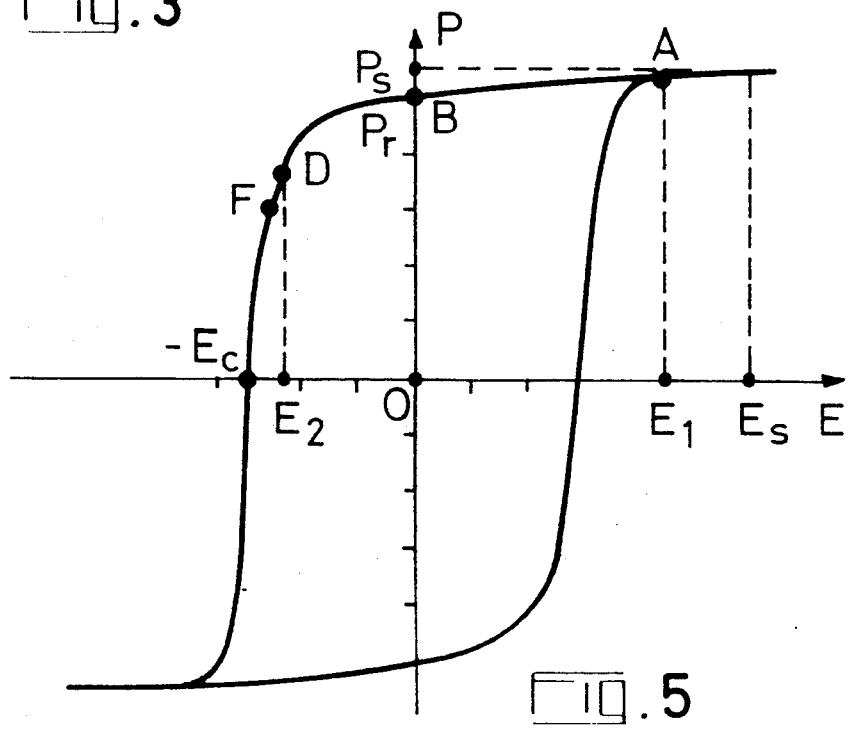
Fig. 5

3,782,802

FERRO-ELECTRIC SYSTEM FOR BULK STORAGE OF PHASE HOLOGRAMS

The present invention relates to systems intented to form, within the volume of a photo-excitable ferro-electric crystal, a bulk pattern of interference fringes which constitutes a phase hologram.

The formation of this fringe pattern is based upon the property of induced birefringence of the ferro-electric materials; the changes in the refraction index can be explained by a modification of the internal electric field which is due to a non-uniform redistribution of photo excited electrical charges.

When, within the volume of a suitably transparent and doped photo-excitable ferro-electric crystal, there are caused to interact two coherent optical radiation components, then there takes place the formation of an index grating or phase hologram which is closely related to the pattern of interference fringes produced by interference between these two radiation components. This phase hologram, by diffracting one of the two radiation components used to construct it, is capable of reconstructing a radiation component of the same kind as the other radiation component; this property makes it possible, in particular, to produce holographic lenses or records which can reconstruct a real or virtual image of an object.

The reconstruction of a hologram follows its construction, and assumes that it is subject continuous illumination which may erase the stored information.

It is essential in pratice, that the diffracting properties of a phase hologram be retained wherever necessary.

Experience has shown that phase holograms produced using ferro-electric crystals, do not satisfactorily conserve their diffracting properties in the latent state, and that they very quickly loose them as soon as they are used in a process of optical reconstruction. In order to appreciably improve the lifetime of hologram constructed from ferro-electric crystals, it is known to subject them to a heat-treatment the effect of which can be compared with that of the fixing of a photographic emulsion; the treatment consists in raising the crystal, during the course of formation of the hologram or immediately there after, to a temperature higher than the working temperature; after cooling, a much more durable hologram is obtained but this thermal fixing process suffers from the drawbacks that it is slow and a delicate one to implement.

To overcome these drawbacks, the invention provides for the formation of the phase hologram in the volume of a ferro-electric crystal having a hysteresis cycle at ambient temperature; the photo-excited crystal is then electrically fixed by the application of an electric field which tends to produce a polarization reversal.

After this very short treatment, the crystal lattice exhibits non-uniform ionic polarization which remain insensitive to the effect of the optical radiation used for reconstruction purposes.

The crystal can be returned to a state of uniform polarization by the application of a saturation polarization field which erases the non-uniform fields generated by the migration of charges which have been photo-excited from localized impurities or defects.

In accordance with the present invention there is provided: a ferro-electric system for bulk storage of phase holograms constituted by index changes in the body of a plate of photo-excitable ferro-electric material, said system comprising : optical means for the photo-excitation of the said plate by at least one pattern of interference fringes, and electrical means for fixing the index changes photo induced in said plate; said ferro-electric material exhibiting at ambient temperature a hysteresis loop; said electrical means including means electrically polarising said plate, during an initial phase of operation, for creating a remanent polarisation smaller than the saturation polarization of said ferro-electric material, and applying in a further phase of operation an electric fixing field across said plate; said electric fixing field being oppositely-directed to the electric field applied during the course of said initial phase, and having a strength bringing the working point of said material in the high slope portion of its hysteresis loop.

For a better understanding of the present invention, and to show how the same may be carried into practice, reference will be made to the ensuing description and the attached figures among which:

FIGS. 3, 4, 5 and 6 are explanatory figures;

FIG. 1 shows a holographic storage system for forming a phase hologram, comprising a plate 10 of ferro-electric crystal whose crystalographic axis c is disposed parallel to the large faces of the plate; these faces are perpendicular to the normal N, represented by a chain-dotted line.

Figure 1:
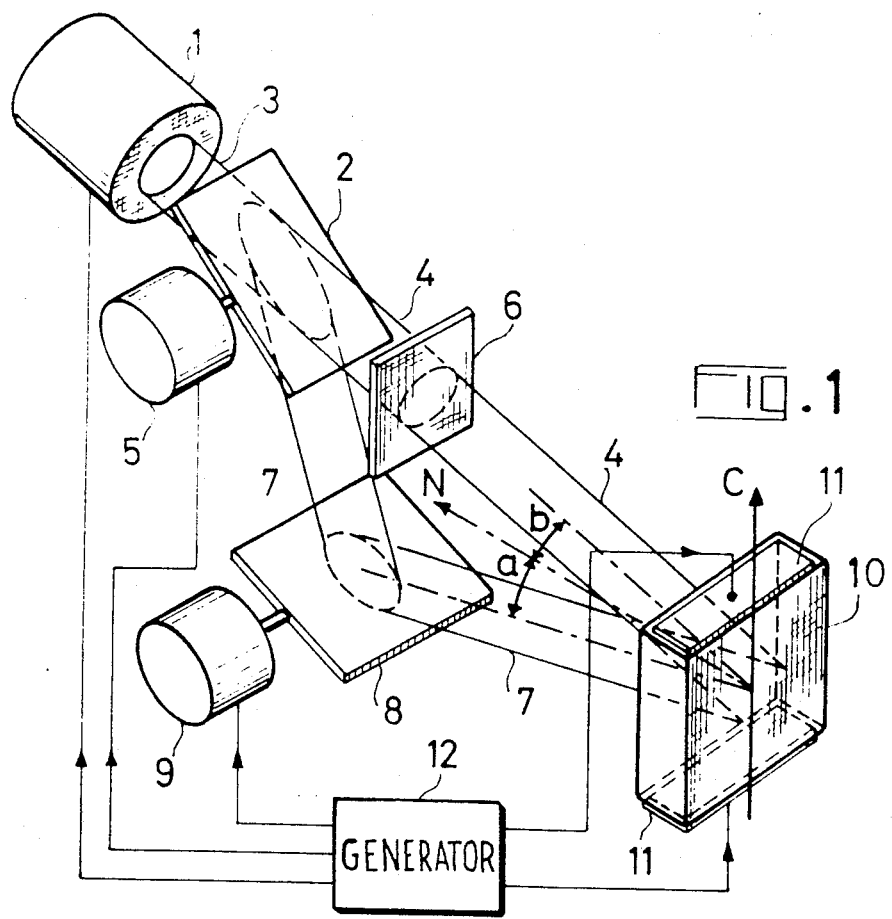
FIG. 1 illustrates an embodiment of the system in accordance with the invention.

The ferro-electric crystal constituting the plate 10 is a material which, at ambient temperature, exhibits a hysteresis loop such as that shown in FIG. 5. This material is furthermore photo-excitable by means of a coherent optical radiation source 1 and, to this end, is impurity doped, the impurities, unifomly distributed through the crystal, forming traps for migrating electrons liberated by photo-excitation.

By way of a non-limitative example, the crystal used is a barium titanate crystal, the doping element or elements for which are in particular nickel, cobalt (0.5 mol%) and iron (trivalent 0.25 mol%); in order to enable bulk storage of the hologram to be achieved, the doped ferro-electric material should transmit the photo-excitation radiation; this condition is satisfied by $BaTiO_3$ if the thickness of the plate 10 is only some few hundreds of microns and if the source 1 is an argon laser emitting photo-excitation radiation at the wavelength 4880 Å. Another example of a suitable ferro-electric crystal is potassium niobate, $KNbO_3$, which makes it possible to use thicker plates; by contrast, lithium niobate, $LiNbO_3$, cannot be used because it exhibits no hysteresis cycle at the ambient temperature.

To form index changes in the body of the ferro-electric plate 10, it is necessary to provide optical photo-excitation means which produce at least one pattern of interference fringes. A plurality of fringe patterns can be also superimposed during the photo-excitation phase.

These optical means comprise the optical radiation source 1, which produces a coherent light beam 3 split by a semi-transparent mirror 2 into an object beam 4 and a reference beam 7; these beams are crossing at the plate 10, thanks to the provision of a mirror 8. Changes in position of the mirrors 2 and 7 can be controlled by alignment and displacement devices 5 and 9 which cause the beam 7 to intersect the beam 4 at the plate 10 with an angle of incidence "a" which, if necessary, can have several different values.

In the case shown in FIG. 1, an optically modulating object 6 has been illustrated in the trajectory of the object beam 4, so that the pattern of fringes produced by interference between the beams 4 and 7 is representative of the object 6; this pattern could likewise be used to characterize the interference between two distinct spherical wave fronts, in which case the phase hologram would constitute a holographic lens. It is worthwhile pointing out that the hologram formed in the ferro-electric plate 10 can be either a two-dimensional hologram, or a thick hologram, depending upon the thickness of the plate as compared to the wavelength of the photo-excitation radiation. In the case of the formation of a thick hologram, the optical irradiation of the plate 10 may be split into several successive steps, the alignment of the reference beam 7 changing with each step, so that the overall hologram can selectivaly reconstitute the images of separate objects 6 used, in each step, to optically modulate the object beam 4.

In FIG. 1, it can be seen that the plate 10 is provided with means for electrically polarising the ferro-electric crystal which constitutes it.

These means comprise electrodes 11 arranged to produce a field parallel to the axis c, and a generator 12 which applies a variable polarising voltage to said electrodes 11; the generator 12 likewise controls the devices 1, 5 and 9 in order to determine the duration of photo-excitation of the ferro-electric plate 10, and the conditions under which it takes place.

It will be observed, in FIG. 1, that the directions in whcih the beams 4 and 7 are incident, have a means value which is substantially perpendicular to the axis c; this arrangement is the best insofar as the electro-optical effect upon which the existence of the index grating depends, is concerned, because the elipsoid of the indices has its major axis along the axis c and it is with this direction of light vibration that the greatest index variations are obtained.

Figure 2:
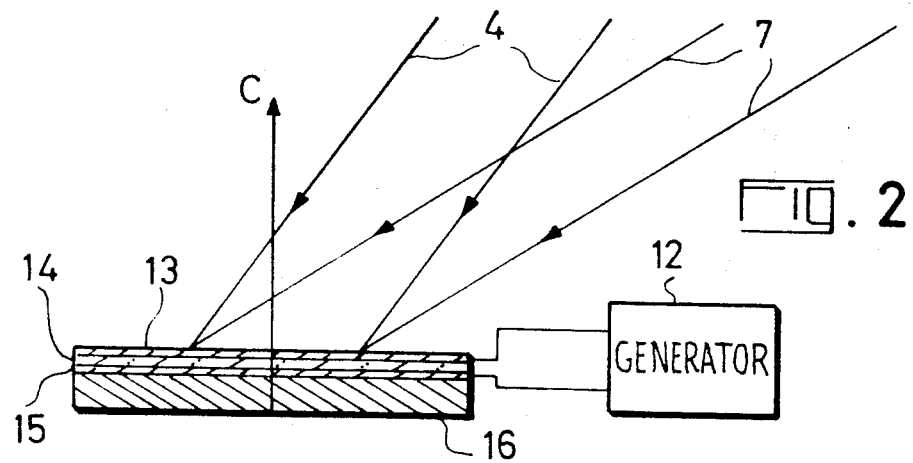
FIG. 2 illustrates a first variant embodiment of a holographic substrate in accordance with the invention.

In FIG. 2, a variant embodiment of the plate 10 can be seen. This variant comprises a transparent substrate 16 upon which there have been successively deposited a transparent electrode 15, a ferro-electric crystaline layer 14 and a second transparent electrode 13; the axis c of the layer 14 is here normal to the large faces of the latter, and in order to obtain a substantial electro-optical effect, it is necessary that the means of the directions of object beam 4 and reference beam 7, should be oblique in relation to the axis c. The electrodes 13 and 15, are, of course, supplied by the generator 12, as in FIG. 1.

To understand the operation of the system shown in FIG. 1 and the variant embodiment shown in FIG. 2, it will be assumed initially thet the ferro-electric crystal has a remanent polarization $P_r$ corresponding to the point B in the cycle of FIG. 5. To this end, the generator 12 will previously have created in the crystal a field $E = E_1$, which will subsequently have been cancelled.

In FIG. 3, a simplified diagram of the energy bands W of the photo-excitable ferro-electric crystal can be seen; a valency band 17 and a conduction band 19 have been shown, separated by a forbidden band 18. In the forbidden band, there is an intermediate level X characterizing the photo-excitation energy of the traps present in the crystal; a photon $h\nu$ can produce optical transitions to the conduction band 19, liberating electrons and holes in the body of the crystal.

In FIG. 4, a brief illustration has been given of the mechanism of photo-excitation and trapping of the charges liberated in the body of a fragment 20 of the ferro-electric crystal, the assumption having been made on the one hand that there is an internal field $E_i$ because of the remenent electrical polarization, and on the other hand that the portion 21 of the fragment 20 located above the broken line 25 is illuminated whilst the cross-hatched portion 22 is not. The traps 23 and 24 present in the fragment 20 can respectively liberate charges $-e$ and subsequently capture them.

It will readily be appreciated from a study of FIG. 4, that the photons $h\nu$ photo-excite charges (electrons) $-e$ from the traps 23, which migrate under the action of the internal field $E_i$; they travel until they are captured by the traps 24. The illuminated portion 21 thus acquires a positive charge whilst the dark region 22 is negatively charged. After a certain time of photo-excitation, a photo induced electric field $E_e$ grows up against the field $E_i$ which, prevents the continued migration of charges.

It will readily be appreciated that the ferro-electric crystal, when subjected to photo-excitation by a pattern of interference fringes, will exhibit a non-uniform electron distribution, capable of forming index changes by an electro-optical effect. These index changes constitute a phase hologram but when the object beam 4 is cut off, the continuous read-out illumination by the reference beam 7 tends to erase the created phase hologram very quickly.

As those skilled in the art will appreciate, the read-out beam of a hologram is exactly similar to the reference beam 7 and it will be seen therefore that a photo induced non-uniform electric field distribution, is essentially transient when it is created by migrating electrons.

To remedy this drawback, it is necessary to arrange for the substitution of the non-uniform electric field distribution obtained by the photo-excitation of the crystal, by another electric field distribution derived therefrom and insensitive to subsequent photo-excitation of the crystal.

In accordance with the invention, this transformation is obtained by an electrical fixing operation.

It has been experimentally determined that if there is applied to the photo-excited ferro-electric crystal, an electric field which tends to reverse its initial electrical polarization then a very short time will suffice to produce a non-uniform electric field distribution there, of ionic type, which, contrary to the photo induced electron distribution, cannot be erased by subsequent photo-excitation of the crystal.

The most plausible explanation for the process of electrical fixing, is based upon the following considerations: in the volume of the photo-excited crystal, the electron migrations have neutralised the internal electric field in certain areas defined by the location of the interference fringes. However, this internal field modulation does not, in the absence of an external electric field, produce any appreciable changes in electrical polarization; in effect, an examination of the hysteresis loop of FIG. 5 shows that the crystal is in the state B after the cancellation of the initial field $E_1$ (which is weaker than the saturation field $E_s$) to which it was previously subjected. Whatever the deviation of the working point in the neighbourhood of the point B, there is no appreciate change in the remanent polarization measured by the distance OB, because the system is in a zone of low incremental permitivity. By contrast, if the mean working point is displaced in the hysteresis loop, by yhe application to the crystal of an electric field $E_2$ opposite to $E_1$ and slightly weaker than the coercive field $E_c$, then the system arrives at the point D in a zone of high incremental permitivity of the hysteresis cycle.

The result is that the electrical polarization, which is essentially of ionic-type undergoes substantial and rapid changes due to the partial switching of the ferro-electric domains.

This switching will have the effect of compensating the photo-induced field modulation, of electronic type, which the photo-excitation has produced, and, when the field $E_2$ is cancelled at the end of the fixing operation, there will remain within the body of the crystal a non-uniform remenent polarization, of ionic-type. The partial shift zone is located in the portion BF of the hysteresis loop.

Beyond the point F, the switching becomes total and the field $E_2$ must not be excessively strong, since this would otherwise produce a general switching in all the ferro-electric domains.

In practice, the fixing field $E_2$ is chosen so that the working point D is close to the point F, so that the fixing is carried out in a steep slope zone of the hysteresis loop.

Figure 6:
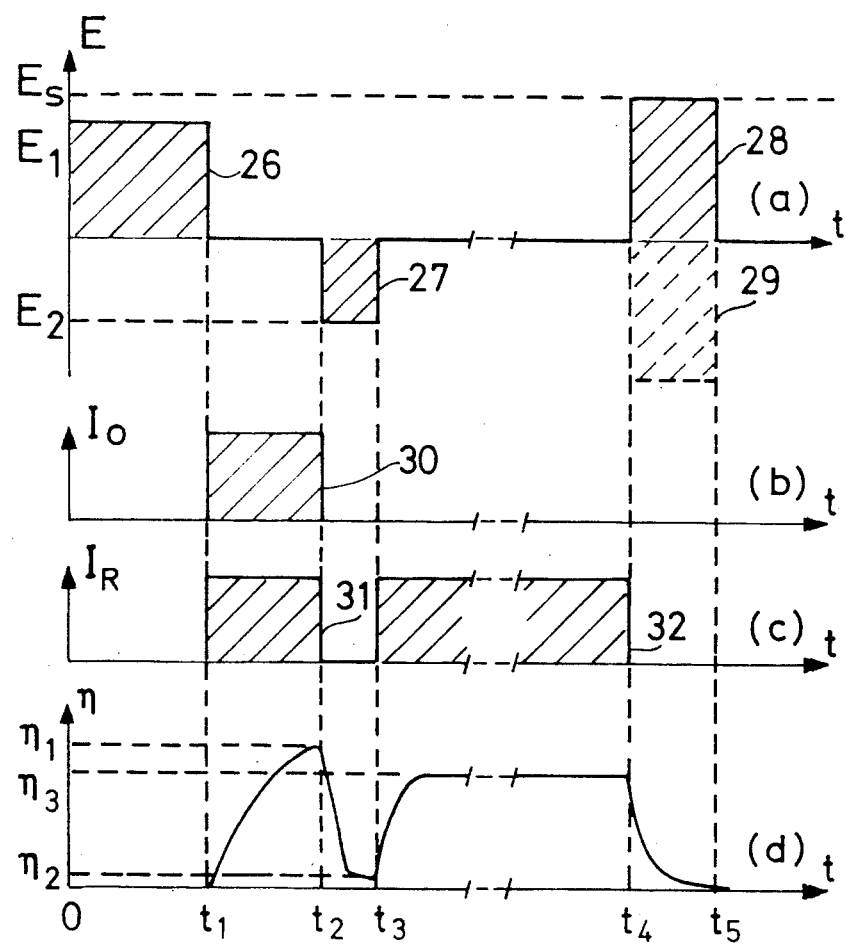

The diagram of FIG. 6 illustrates the operation of the system used to form a phase hologram, including the read-out phase and the erase phase.

At (a) there has been plotted as a function of time the strength of the external electric field E applied to the ferro-electric crystal; at (b) the value of the luminous intensity $I_o$ of the object beam 4 has been plotted; at (c) the luminous intensity $I_r$ of the reference beam 7 has been plotted; and at (d) the development of the diffraction efficency $\eta$ during the reading out of the hologram, corresponding to various stages in its formation or utilisation.

Between the instants O and $t_1$, there is the initial phase of polarization of the crystal; it is not yet photo-excited but is being subjected to an electric field 26 of amplitude $E_1$. Between the instants $t_1$ and $t_2$, there develops the recording phase which corresponds to photo-excitation by the object and reference beams; this is symbolised by the presence of the square areas 30 and 31; the recording phase takes place in the zero field state and the read-out efficiency varies progressively from O to $\eta_1$. Between the instants $t_2$ and $t_3$, the electrical fixing operations takes place, this being characterized by the application of an electric field $E_2$ represented by the square area 72; the fixing produces a reduction in the read-out efficiency $\eta$ because the partial shift in the ferro-electric domain electrically compensates for the electrical migrations produced during the cours of the preceding phase.

Between the instants $t_3$ and $t_4$, there takes place the reconstruction phase which may last indefinitely; during this phase, the hologram is subject solely to the continuous illumination of the reference beam whose effect is symbolised by the square area 32; the read-out efficiency increases from a low value $\eta_2$ and regains a value $\eta_3$ comparable to the value acquired at the end of photo-excitation. Between the instants $t_4$ and $t_5$, an erase phase has been indicated which suppresses the index changes by the application to the crystal of a saturation electric field $E_s$ which can have an arbitrary polarity; the erase field corresponds either to the positive area 28 or to the negative area 29 and reduces the read-out diffraction efficiency $\eta$ to zero.

In the foregoing, the index changes created by photo-excitation and fixing in the ferro-electric plate 10, have been ultimately erased. This latter facility can apply either to the whole area of the plate or only to certain portions thereof.

If the phase hologram substrate is of the kind shown in FIG. 2, the partial erasing can be achieved by making the electrode 13 in the form by parallel insulated bands to which the erase voltage can be selectively applied; a similar splitting into electrode bands 15, makes it possible to effect selective erasing at the intersection between two bands, the erase voltage being applied between a top band and a bottom band.

Figure 7:
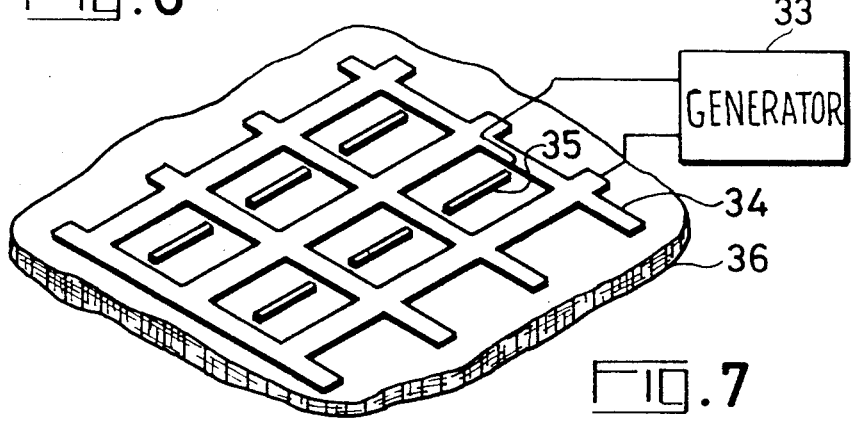
FIG. 7 illustrates a second variant embodiment of a holographic substrate in accordance with the invention.

Partial erasing can also be carried out if the hologram substrate is of the kind shown in FIG. 7.

In FIG. 7, a ferro-electric substrate 36 carrying a conductive grid 34 with rectangular meshes, can be seen.

At the centre of each mesh there is an electrode 35 aligned perpendicularly to the axis c of the crystal containing the substrate 36. An electrical generator 33 supplied the electrodes 34 and 35 and can selectively induce in any of the meshes, an electric erase field directed parallel to the axis c at either side of the electrode 35.

The grid 34 is an earth electrode each mesh of which encloses two areas having the characteristics of the substrate 10 shown in FIG. 1; these areas cooperate to constitute an erasable holographic unit integrated into a matrix of rows and columns. It should be pointed out that the generator 33 could control not only selective erasing but also selective fixing of each holographic unit of the substrate 36.

What we claim is:

1. Ferro-electric system for bulk storage of phase holograms constituted by index changes in the body of a plate of photo-excitable ferro-electric material, said system comprising: optical means for the photo-excitation of the said plate by at least one pattern of interference fringes, and electrical means for fixing the index changes photo induced in said plate: said ferro-electric material, exhibiting at ambient temperature a hysteresis loop; said electrical means including means electrically polarising said plate, during an initial phase of operation for creating a remanent polarization smaller than the saturation polarization of said ferro-electric material, and applying in a further phase of operation an electric fixing field across said plate; said electric fixing field being oppositely-directed to the electric field applied during the course of said initial phase, and having a strength bringing the working point of said material in the high slope portion of its hysteresis loop.

2. Ferro-electric system as claimed in claim 1, wherein said electrical means comprise an electrical generator, and electrodes supplied by said electrical generator for producing a polarising electric field in at least a portion of the area of said plate.

3. Ferro-electric system as claimed in claim 1, wherein photo-excitation of said plate by said optical means occurs between said initial and further phases of operation.

4. Ferro-electric system as claimed in claim 1, wherein said electrical means provide, beyond said further phase of operation, an electric saturation field in said plate for erasing said photo induced index changes in at least a portion of the area of said plate.

5. Ferro-electric system as claimed in claim 1, wherein said index changes contitute a phase hologram capable of selectively reconstructing the image of at least one optically modulating object; the photo-excitation of said plate being performed through the medium of said object.

6. Ferro-electric system as claimed in claim 1, wherein said index changes constitute a holographic lens.

7. Ferro-electric system as claimed in claim 1, wherein the large faces of said plate are substantially parallel to the crystalographic axis of said ferro-electric material along which there are directed the electric fields created by said electrical means.

8. Ferro-electric system as claimed in claim 1, wherein the large faces of said plate are substantially perpendicular to the crystalographic axis of said ferro-electric material along which are directed the electric fields created by said electrical means.

9. Ferro-electric system as claimed in claim 1, wherein said electric fixing field has a strength lower then the coercive field corresponding to said remanent polarization and sufficient to cross the knee in said hysteresis loop, lying between the low permitivity region and the high permitivity region.

10. Ferro-electric system as claimed in claim 1, wherein said index changes constitute a three-dimensional pattern of fringes occupying the whole of the photo excited volume of said plate.

11. Ferro-electric system as claimed in claim 1, wherein said plate is cut from a barium titanate crystal containing at least one doping element chosen from among nickel, cobalt and iron.

12. Method of fixing index changes grating photo induced in a plate of photo-excitable ferro-electric material having a hysteresis cycle at ambient temperature, said fixing method comprising the following steps:
   a. creation of a remanent polarization in said crystal, before photo-excitation of said plate;
   b. photo-excitation of index changes in said plate;
   c. temporary application of a fixing electric field to produce partial switching in the ferro-electric domains of said photo-excited plate.

* * * * *